(12) United States Patent
Abraham et al.

(10) Patent No.: US 8,848,559 B2
(45) Date of Patent: Sep. 30, 2014

(54) METHODS AND APPARATUSES FOR DEVICE DISCOVERY

(75) Inventors: Santosh Paul Abraham, San Diego, CA (US); Hemanth Sampath, San Diego, CA (US); Avinash Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 13/358,839

(22) Filed: Jan. 26, 2012

(65) Prior Publication Data

US 2013/0194962 A1    Aug. 1, 2013

(51) Int. Cl.
*G08C 15/00*    (2006.01)

(52) U.S. Cl.
USPC .......................................... 370/252; 370/328

(58) Field of Classification Search
None
See application file for complete search history.

(56) References Cited

U.S. PATENT DOCUMENTS

| | | | | |
|---|---|---|---|---|
| 8,396,064 | B2 * | 3/2013 | Giesberts et al. | 370/392 |
| 2002/0187830 | A1 * | 12/2002 | Stockdale et al. | 463/29 |
| 2010/0080163 | A1 | 4/2010 | Krishnamoorthi et al. | |
| 2010/0322213 | A1 | 12/2010 | Liu et al. | |
| 2011/0076948 | A1 | 3/2011 | Jabara et al. | |
| 2011/0106837 | A1 | 5/2011 | Walton et al. | |

FOREIGN PATENT DOCUMENTS

WO    2009117472 A2    9/2009

OTHER PUBLICATIONS

Anonymous: "Remote discovery of Bluetooth devices", Research Disclosure, Mason Publications, Hampshire, GB, vol. 457, No. 71, May 1, 2002, XP007130375, ISSN: 0374-4353.

Artail, H., et al., "A Cluster Based Service Discovery Model for Mobile Ad Hoc Networks", Wireless and Mobile Computing, Networking and Communications, 2007. WIMOB 2007. Third IEEE International Conference on, IEEE, Piscataway, NJ, USA, Oct. 8, 2007, p. 57, XP031338340,.

International Search Report and Written Opinion—PCT/US2013/022259—ISA/EPO—Mar. 12, 2013.

Lin, et al., "Prioritized Time-constraint P2P Packet Scheduling using Lagrange Multiplier for Advertisement Push/Broadcast Systems", 2010 International Symposium on Communications and Information Technologies (ISCIT), 2010 IEEE, pp. 529-533.

"Wi-Fi Peer-to-Peer (P2P) Technical Specification," Wi-Fi Alliance Technical Committee P2P Task Group, version 1.1, 2010, pp. 1-159.

* cited by examiner

*Primary Examiner* — Jianye Wu
(74) *Attorney, Agent, or Firm* — Kevin T. Cheatham

(57) ABSTRACT

An information providing method is performable in a wireless network having a plurality of group owner devices respectively controlling a plurality of groups of devices. The information providing method includes periodically transmitting, by a first group owner device that controls a first group of devices, a first packet that includes device descriptors of client devices associated with the first group owner device. The information providing method further includes receiving, by a second group owner device that controls a second group of devices and that is adjacently located with respect to the first group owner device, the first packet transmitted by the first group owner device. The information providing method also includes periodically transmitting, by the second group owner device, a second packet that includes the device descriptors of the client devices associated with the first group owner device.

41 Claims, 11 Drawing Sheets

METHODS AND APPARATUSES FOR DEVICE DISCOVERY

FIELD

Aspects of the present disclosure relate generally to apparatuses and methods for device discovery and, more specifically, to apparatuses and methods for providing enhanced discoverability ranges for Wi-Fi Direct and other peer-to-peer networks.

BACKGROUND

One of the limitations of Wi-Fi™ networks and peer-to-peer networks is a small transmission range and/or reception range of stations, which are also referred to as client devices, that exist in the networks. Therefore, a geographical span of services that can be provided by client devices with existing Wi-Fi™ is limited.

SUMMARY

An information providing method in accordance with an aspect is for a wireless network having a plurality of group owner devices respectively controlling a plurality of groups of devices. In various aspects, the information providing method includes (i) periodically transmitting, by a first group owner device that controls a first group of devices, a first packet that includes device descriptors of client devices associated with the first group owner device; (ii) receiving, by a second group owner device that controls a second group of devices and that is adjacently located with respect to the first group owner device, the first packet transmitted by the first group owner device; and (iii) periodically transmitting, by the second group owner device, a second packet that includes the device descriptors of the client devices associated with the first group owner device.

A non-transitory processor readable storage medium in accordance with an aspect stores one or more programs that, when executed by one or more processors of a first group owner device, cause the first group owner device to perform a method. In various aspects, the method includes (i) transmitting, by the first group owner device that controls a first group of devices, a first packet that includes device descriptors of client devices associated with the first group owner device; (ii) receiving, by the first group owner device from a second group owner device that controls a second group of devices and that is adjacently located with respect to the first group owner device, a second packet transmitted by the second group owner device that includes device descriptors of client devices associated with the second group owner device; and (iii) transmitting, by the first group owner device, a third packet that includes the device descriptors of the client devices associated with the second group owner device and that includes the device descriptors of the client devices associated with the first group owner device.

An apparatus in accordance with an aspect includes a processor and a receiving unit. In various aspects, the processor is configured to cause transmission a first packet that includes device descriptors of client devices in a first group of devices and the receiving unit is configured to receive a second packet transmitted by another apparatus in a second group of devices, where the second packet includes device descriptors of client devices in the second group of devices. In various aspects, the processor is further configured to cause transmission of a third packet that includes the device descriptors of the client devices in the first group of devices and that includes the device descriptors of the client devices in the second group of devices.

An apparatus in accordance with an aspect includes (i) means for transmitting a first packet that includes device descriptors of client devices associated with the apparatus; (ii) means for receiving, from a second apparatus that controls a group of devices associated with the second apparatus, a second packet transmitted by the second apparatus that includes device descriptors of client devices associated with the second apparatus; and (iii) means for transmitting a third packet that includes the device descriptors of the client devices associated with the apparatus and that includes the device descriptors of the client devices associated with the second apparatus.

An information providing method in accordance with an aspect is for a wireless network having a plurality of group owner devices respectively controlling a plurality of groups of devices. In various aspects, the information providing method includes (i) periodically transmitting, by a first group owner device, a packet that includes device attributes of devices in a first group of devices controlled by the first group owner device, where the device attributes include advertisement information of at least one device within the first group of devices; (ii) receiving, by a second group owner device that controls a second group of devices and that is adjacently located with respect to the first group owner device, the packet transmitted by the first group owner device; and (iii) providing the advertisement information to at least one device within the second group of devices and to one or more group owner devices of one or more neighboring groups of devices with respect to the second group of devices. In various aspects, the providing is performed by the second group owner device.

A non-transitory processor readable storage medium in accordance with an aspect stores one or more programs that, when executed by one or more processors of a first group owner device that controls a first group of devices, causes the first group owner device to perform a method. In various aspects, the method includes (i) receiving, by the first group owner device from a second group owner device that controls a second group of devices, a packet that includes device attributes of devices in a second group of devices controlled by the second group owner device, where the device attributes include advertisement information of at least one device within the second group of devices; and (ii) providing the advertisement information to at least one device within the first group of devices and to one or more group owner devices of neighboring groups of devices with respect to the first group of devices.

DETAILED DESCRIPTION

Figure 1:
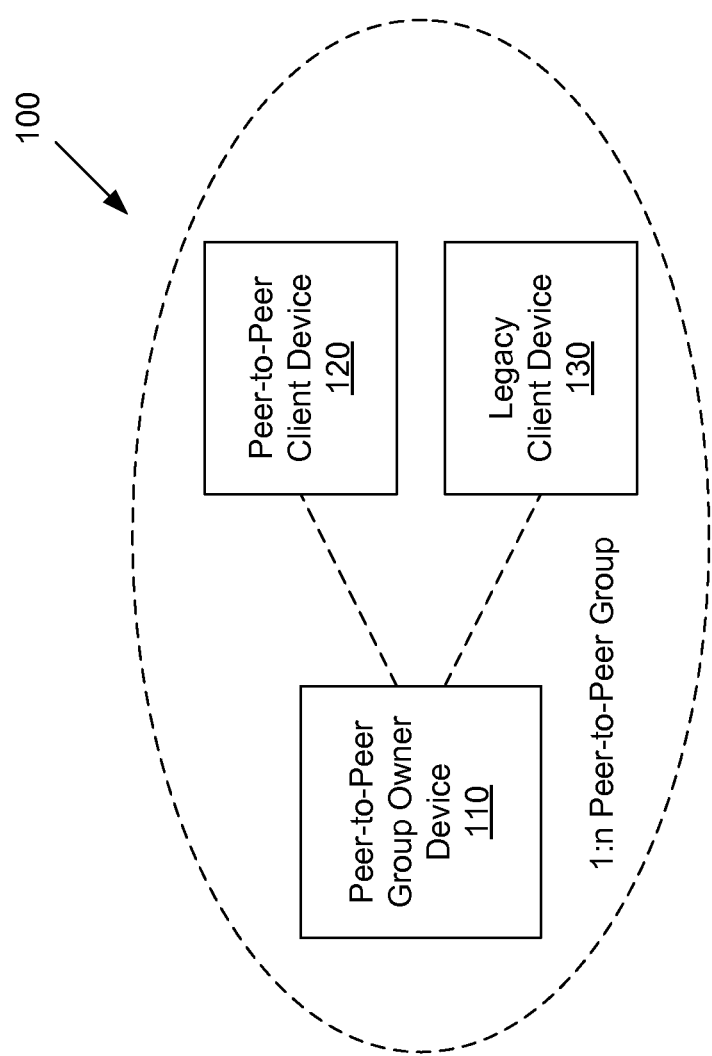
FIG. 1 is a diagram showing a group within a network, with a group owner device that controls the group.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects. Various aspects of an enhanced discoverability system and method are described herein.

Wi-Fi Direct is a protocol that enables Wi-Fi stations to communicate directly with each other without going through an access point. Typical applications of Wi-Fi Direct are for connections from a personal computer to a printer, or from a media server to a television set, etc. A station, which is also referred to as a client device, may correspond to a personal computer, a smart phone, a printer, a camera, or other type of electronic device. Various aspects disclosed herein leverage Wi-Fi Direct for applications such as: (1) discovery of stations; and (2) data push type services such as advertising. Various aspects as described herein provide the capability to discover stations in adjacent or nearby groups within a Wi-Fi direct network, and to push services such as advertising to devices in those other groups within the network.

Various aspects described herein are directed to methods for augmenting the Wi-Fi Direct protocol to efficiently discover stations over larger distances than a range of the devices themselves, and some aspects provide the capability of accommodating data push type applications such as advertising.

A peer-to-peer network includes a group owner device and peer-to-peer client devices (also referred to herein as stations). A group owner device may also be called a point network controller or point coordinating function. The peer-to-peer client devices associate with a group owner device, and are a part of a group of peer-to-peer client devices managed by the group owner device. Functions of the group owner device include selecting an operating channel, transmitting beacons, allowing discovery of associated clients, being a Dynamic Host Configuration Protocol server to enable Internet Protocol layer communication, and the like. A peer-to-peer client device of a group owner device may communicate with another peer-to-peer client device of the same group through the group owner device of that group. In some aspects, the group owner device may allow the peer-to-peer client devices of the same group to directly communicate with each other.

FIG. 1 shows a peer-to-peer group 100 that includes a peer-to-peer group owner device 110, a peer-to-peer client device 120, and a legacy client device 130. The legacy client device 130 communicates with the peer-to-peer client device 120 by way of the peer-to-peer group owner device 110.

Figure 2:
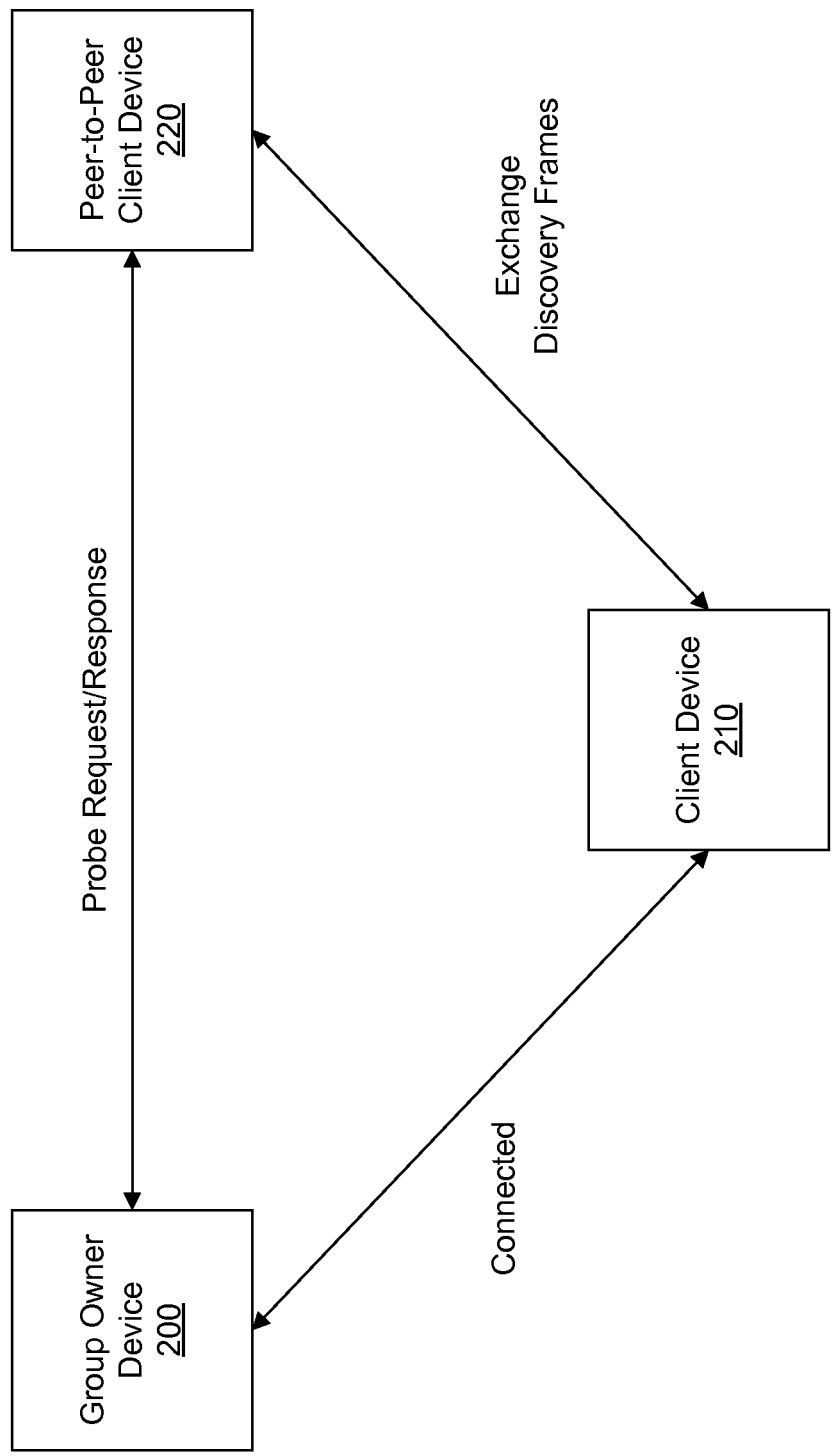
FIG. 2 is a diagram showing an example of a peer-to-peer network.

An example of an operation of a peer-to-peer network is described with reference to FIG. 2. The example peer-to-peer network of FIG. 2 includes a group owner device 200, a client device 210, and a peer-to-peer client device 220. An example may be considered in which the group owner device 200 comprises a laptop computer, the client device 210 comprises a printer, and the peer-to-peer client device 220 comprises a camera. In the example, the client device 210 is associated with the group owner device 200.

If the peer-to-peer client device 220 tries to discover, for example, a printer within the group that the peer-to-peer client device 220 is associated with, the group owner device 200 responds to the peer-to-peer client device 220 with device descriptors of all devices associated with the group owner device 200. The device descriptors include information such as device ID, device type, and/or the like for each device. In the example, the client device 210 does not respond to probe request/response frames output by the peer-to-peer client device 220, since it is not the group owner.

Once the peer-to-peer client device 220 is made aware of the client device 210 within its group by the group owner device 200, the peer-to-peer client device 220 communicates directly with the client device 210 using the information about the client device 210 provided by the group owner device 200. Based on that information, exchange discovery frames are passed between the client device 210 and the peer-to-peer client device 220, so that these devices can communicate directly with each other to perform some function or task (e.g., a camera sending a job to a printer to print one or more photos stored in the camera).

In order to discover the client devices, which are also called stations, associated with a group owner device, a new client device in the network can send a probe request to a group owner device of the group to which it has been assigned. The group owner device may then respond to the probe request with a probe response that contains information elements, where the information elements contain device descriptors about all the devices associated with the group owner device (i.e., all of the devices associated with the group controlled by the group owner device). Hence, the group owner device aids a client device in discovering about other devices within its group.

In conventional Wi-Fi Direct or peer-to-peer networks, a group owner device only has information about client devices that are associated with that group owner device (i.e., that are in the same group controlled by the group owner device). Hence, the discoverability range of existing peer-to-peer networks such as Wi-Fi Direct is limited by the wireless transmission range of the underneath media access control and physical layer protocols of the network.

In a deployment of Wi-Fi Direct over wider areas, multiple peer-to-peer networks may be set up due to a limitation of the transmit/receive range of each network, and each network has its own group owner device. In some aspects disclosed herein, the group owner devices of the networks may be connected either via a backhaul link (which can be a wired link or a wireless link), or they may be deployed in locations such that a group owner device can receive transmissions from group owner devices of neighboring or adjacently-located peer-to-peer networks.

Figure 3:
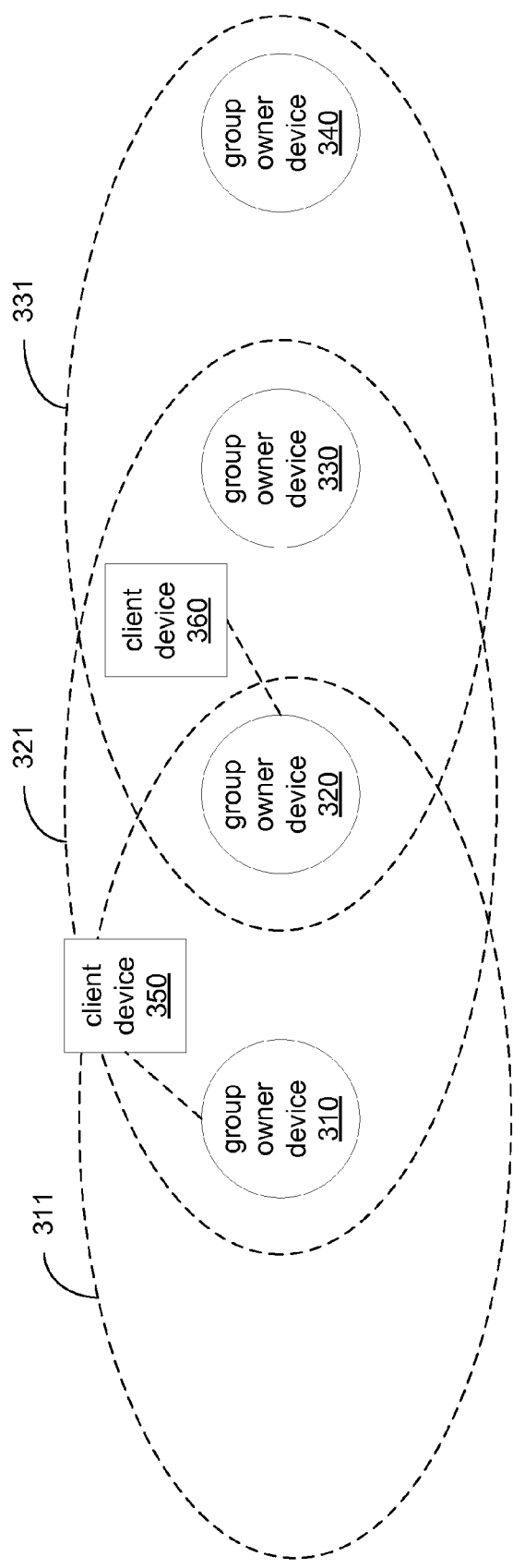
FIG. 3 is a diagram showing adjacently located peer-to-peer networks in accordance with an aspect.

An example in accordance with an aspect is illustrated in FIG. 3. The example of FIG. 3 includes a group owner device 310, a group owner device 320, a group owner device 330, a group owner device 340, a client device 350, and a client device 360. A range of the group owner device 310 is shown by an area 311, and the group owner device 310 is a group owner for a first group. A range of the group owner device 320 is shown by an area 321, and the group owner device 320 is a group owner for a second group. A range of the group owner device 330 is shown by an area 331, and the group owner device 330 is a group owner for a third group.

The group owner device 320 for the second group can receive transmissions from the group owner device 310 in the neighboring first group and from the group owner device 330 in the neighboring third group. A group can be considered to be a "neighbor" with respect to another group if a group owner device of the group can communicate with a group owner device of the other group using, for example, wireless communications, such as a beacon sent over-the-air.

In the example of FIG. 3, the client device 350, which can be a station, is associated with the group owner device 310 in the first group. The client device 360 is associated with the group owner device 320 in the second group. Thus, in the example, the client device 350 and the client device 360 are assigned to different groups. In order for the client device 350 to discover the client device 360, information concerning a presence of other client devices is shared through the group owner devices, such as the group owner devices 310 and 320, and various aspects disclosed herein provide for such discovery amongst different peer-to-peer networks (or groups). A method in accordance with an aspect is described below to enhance a discovery range of client devices by making changes to the existing Wi-Fi Direct protocol. For purposes of explanation, the peer-to-peer network corresponding to the first group can also be referred to as a "network of interest," and the peer-to-peer network corresponding to the second group can also be referred to as a "neighboring network" to the network of interest.

Various aspects provide the capability for: (1) each group owner device being able to gather information about client devices in the neighboring peer-to-peer networks (or groups); and (2) each group owner device being able to broadcast and/or deliver on demand gathered information to client devices within the group that the group owner device manages.

In various aspects, the information gathered by a group owner device is defined using information elements. The information elements can be obtained explicitly either over a backhaul link (e.g., an existing cellular telephone link or a landline link) or by using a probe request/response procedure in which the group owner device of one group sends a probe request to a group owner device of a neighboring group and receives a response in reply to the probe request. In some aspects, the information elements are implicitly obtained in a case where the neighboring group owner device broadcasts such information in packet transmissions or beacon transmissions. An over-the-air beacon or probe-request/response procedure in Wi-Fi Direct does not require a group owner device of a network to be associated with a neighboring peer-to-peer network, and therefore it can be used in changing peer-to-peer network topology (due to mobility of devices within the network).

In various aspects, once a group owner device obtains the information elements, it broadcasts (i.e., delivers) the information elements to client devices of the peer-to-peer network for which it is the group owner using the same mechanisms that were used to obtain the information. For example, a probe request in this case is sent to the group owner device by a client device or station in a group with the group owner device, and a probe response is sent by the group owner device. For example, if a camera within a network of interest is searching for a printer to send a job to and sends out a probe request, the group owner device of the network of interest responds to the probe request with information in a probe response as to where a printer can be found in the network of interest or in a neighboring network.

Figure 4:
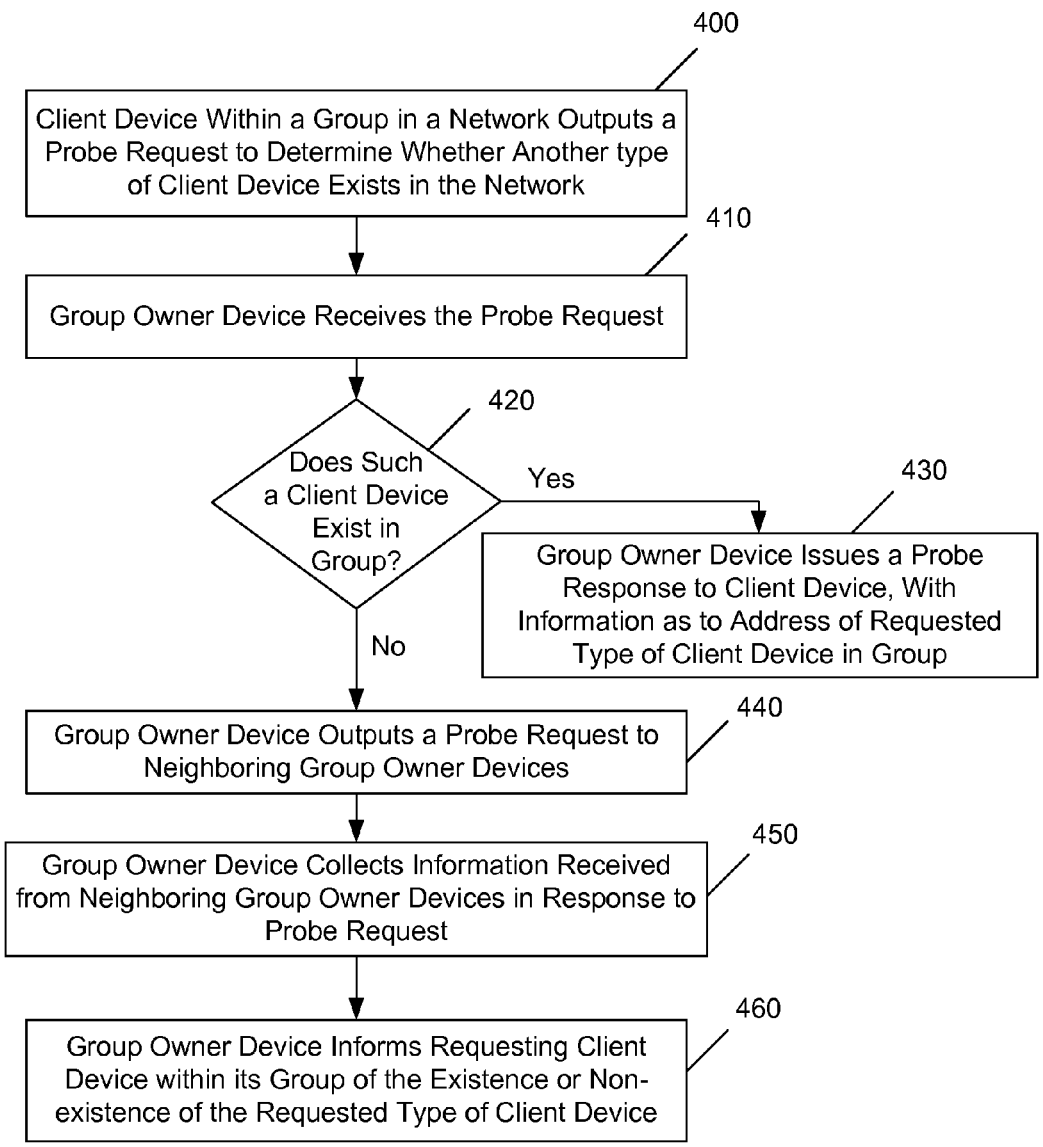
FIG. 4 is a flow diagram of a method in accordance with an aspect showing steps for determining information about other client devices within a same group or other groups.

FIG. 4 is a flow diagram of a method in accordance with an aspect showing steps for a client device to request a group owner device for information about client devices within a same group or in other groups. In step 400, a first client device within a group outputs a probe request to determine whether a particular type of second client device exists in the network. In step 410, the group owner device of the group to which the first client device belongs receives the probe request, and in step 420 the group owner device determines whether such a second client device exists in its group. If the determination in step 420 is Yes, then in step 430 the group owner device outputs a probe response to the first client device, informing it that the particular type of second client device does exist in the same group. The probe response includes information that allows the first client device that output the probe request to directly contact the second client device within its same group.

On the other hand, if the determination in step 420 is No, then in step 440 the group owner device outputs a probe request to neighboring group owner devices to find out whether or not the particular type of second client device exists in the neighboring groups. The probe request can be output either periodically, or on demand (i.e., upon receiving a probe request). In step 450, the group owner device collects information provided in beacons output by the neighboring group owner devices concerning the characteristics of client devices within the neighboring groups. In step 460, based on the collected information, the group owner device informs the first client device either that such a particular type of second client device exists or does not exist in the network.

Figure 5:
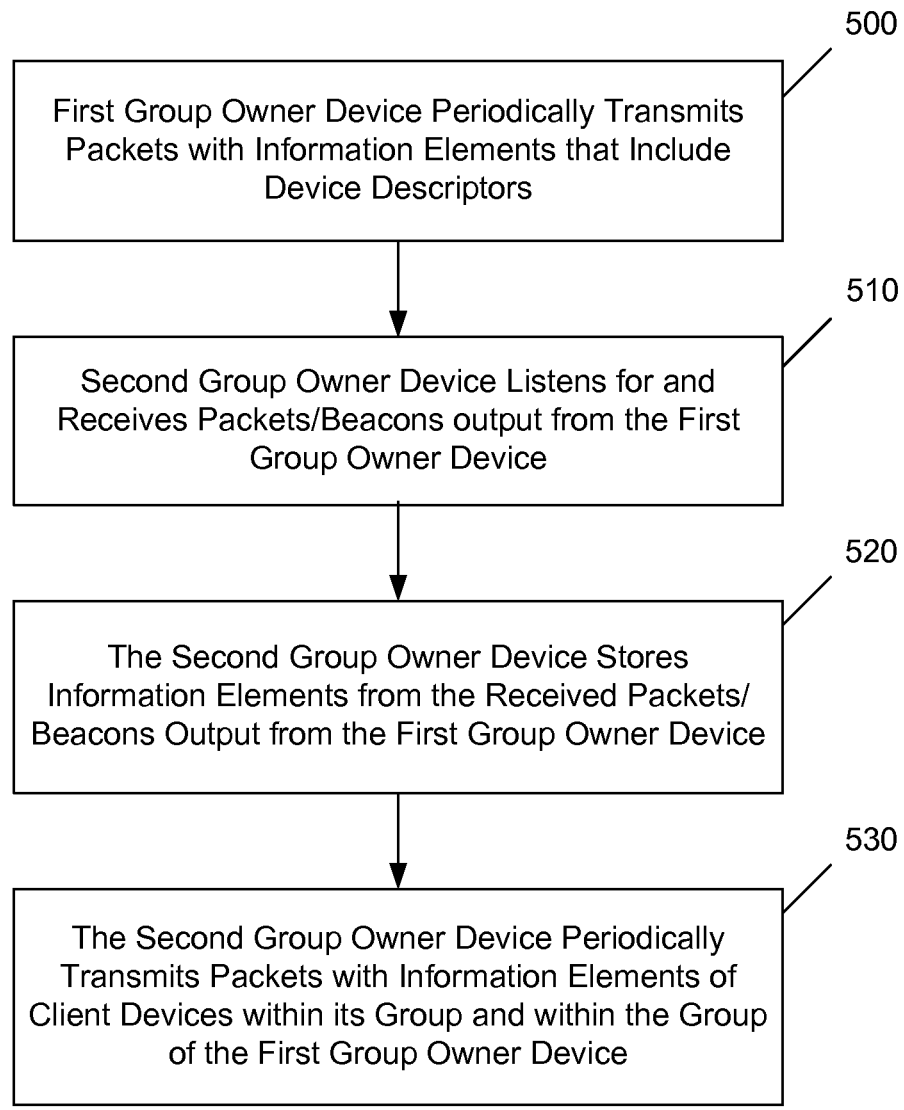
FIG. 5 is a flow diagram of a method in accordance with an aspect showing steps in distributing device information between groups owner devices.

FIG. 5 illustrates a method in accordance with an aspect for increasing a discoverability range of client devices in a Wi-Fi Direct or other peer-to-peer network. In step 500, a first group owner device (e.g., group owner device 310 in FIG. 3) periodically transmits packets with information elements that include device descriptors. In some implementations, the information elements are included in beacons output by the first group owner device, either periodically or on demand (i.e., only when a client device within the group controlled by the first group owner device requests information as to a particular type of client device with which it wants to communicate). In step 510, a second group owner device (e.g., group owner device 320 in FIG. 3) that is in the neighborhood or adjacently-located to the first group owner device (so as to be able to receive packets output from the first group owner device) receives the packets output from the first group owner device.

In step 520, the second group owner device stores the information about client devices within the first group controlled by the first group owner device from the received packet transmitted by the first group owner device. When the second group owner device sends out its next packet or packets with information elements of client devices within the group that it controls to other group owner devices in step 530, that packet or packets also includes the information about the client devices that are associated with the first group owner device (i.e., the devices within the first group controlled by the first group owner device) based on the packet that it previously received from the first group owner device in step 510.

When the second group owner device receives a probe request output by a client device within its group, it determines whether the probe request can be handled by a client device within its group. If the probe request cannot be accommodated by a client device within its group, the second group owner device determines whether the probe request can be accommodated by a client device within the first group controlled by the first group owner device based on the information that it stored in step 520 and, if so, then it notifies the requesting client device of the existence of the requested client device in the first group.

In some aspects, the group owner devices within a network, such as a network using Wi-Fi Direct, may designate a channel in which to send each other probe messages, so that collisions do not occur with respect to signals being sent over the channels of the network. The probe message channel may be a dedicated probe-only channel that is separate from a channel or channels on which data is transmitted, so as to avoid traffic congestion and collisions. The designation of dedicated probe channels may be performed, for example, during network setup or during network reconfiguration, and can be accomplished, for example, via a backhaul link that connects the group owner devices to each other within the network.

In some aspects, device information included in the packets or beacons output by the group owner devices may also include the geo-locations of devices within the respective groups controlled by the group owner devices. That way, a client device in one group can determine the precise location of a client device in another group. This may allow a client device in one group to communicate directly with a client device in another group, if such a direct communication is allowed in the network. For example, by obtaining the precise GPS coordinates of a printer assigned to a neighboring network, a laptop computer may be able to communicate directly with the printer based on the knowledge of the precise locality of the printer.

In some aspects, a group owner device may utilize any available channels when sending out probe requests to neighboring group owner devices. That way, a group owner device can discover neighboring or adjacently-located group owner devices that utilize those different channels. This can be done, for example, by a group owner device sweeping its receiver across the various channels and monitoring them for beacons transmitted by neighboring or adjacently-located group owner devices that it may receive over-the-air. By way of example, a chirp transceiver can be utilized to scan across a plurality of channels to determine whether packets are being output over those channels.

Figure 6:
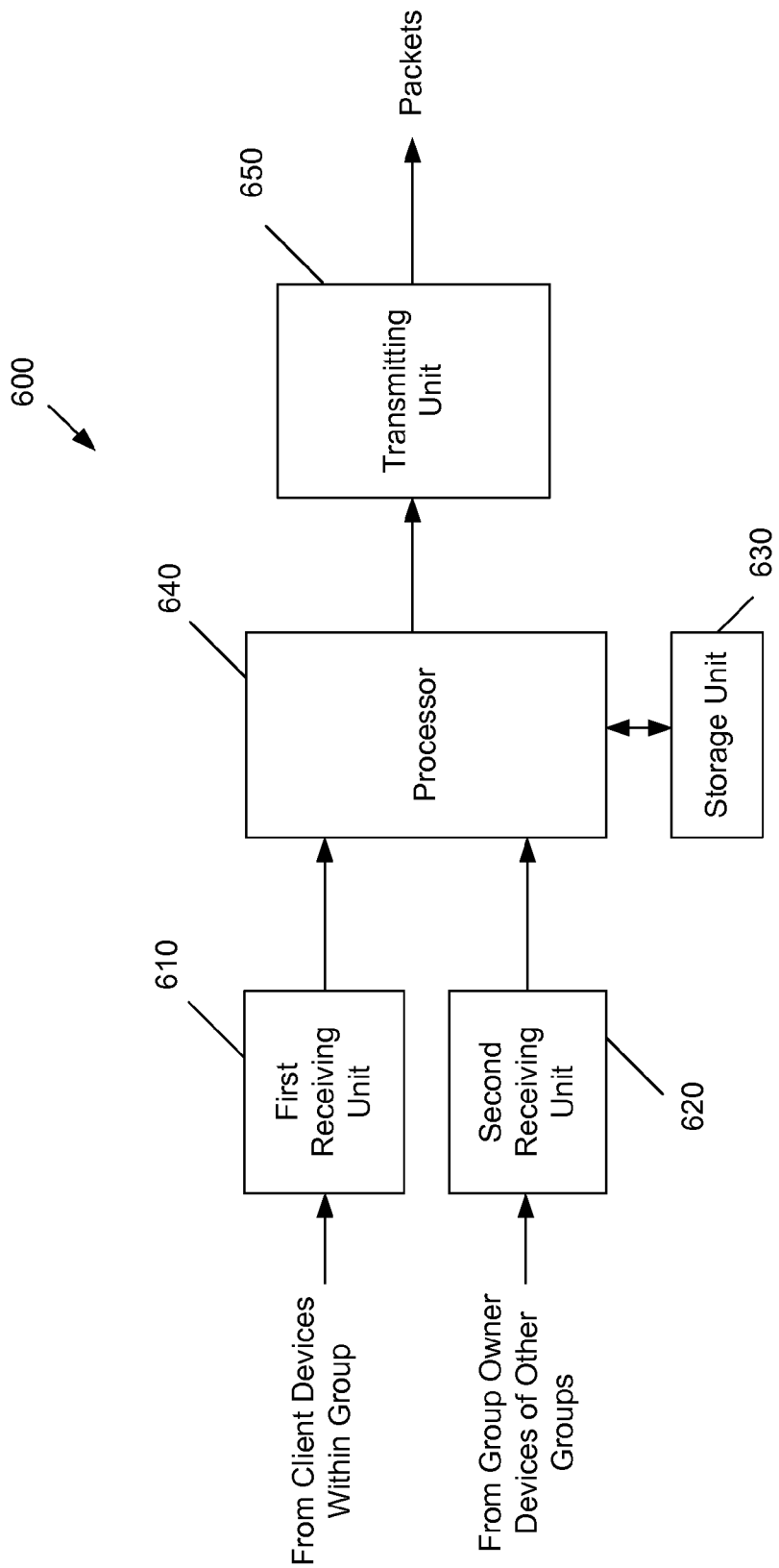
FIG. 6 shows in block diagram form a group owner device in accordance with an aspect.

FIG. 6 shows in block diagram form a group owner device 600 in accordance with an aspect. The group owner device 600 includes a first receiving unit 610 that receives requests from client devices (e.g., stations) within the group that the group owner device 600 controls. The group owner device 600 also includes a second receiving unit 620 that receives packet transmissions or beacon transmissions made by neighboring group owner devices, which may be received on a different channel or channels with respect to signals received by the first receiving unit 610. The group owner device 600 further includes a storage unit 630 that stores information elements of the various client devices within its own group and information elements of various client devices of neighboring groups from which it obtained such information from signals received by the second receiving unit 620.

The group owner device 600 further includes a processor 640 for executing one or more programs stored in the storage unit 630. In various aspects, the processor 640 executes a program to create a packet or a beacon signal based on data stored in the storage unit 630. Also, the group owner device 600 includes a transmitting unit 650 to transmit one or more beacons or packets output by the processor 640. In some aspects, the processor 640 provides a timer signal to the transmitting unit 650, and the transmitting unit 650 transmits packets or beacons based on the timer signal (e.g., periodic transmission of a packet or beacon signal).

As an example, with reference to FIG. 3, if client device 360 in the second group is a personal computer trying to find a printer to print out a job, and the second group does not have a printer device, in conventional Wi-Fi Direct systems, the client device 360 would have to disengage from the second group, and then initiate a procedure to find a client device that functions as a printer and engage with another group to which that printer is also assigned. In various aspects disclosed herein, however, the client device 360 can be notified of client devices in other groups by the group owner device 320. For example, if the client device 350 in the first group is a printer, then the group owner device 310 of the first group periodically transmits a packet or beacon that includes device information about the client device 350 and other devices within the first group. That information is then provided to the client device 360 by the group owner device 320 of the second group when the group owner device 320 outputs the device information of available client devices to the client devices within the second group. As such, in various aspects, the client device 360 can communicate with the client device 350 (via the group owner device 320 and the group owner device 310, in this example), so that, for example, a print job from the client device 360 can be performed by the client device 350 without requiring any of these devices to disengage from their respective groups.

Figure 7:
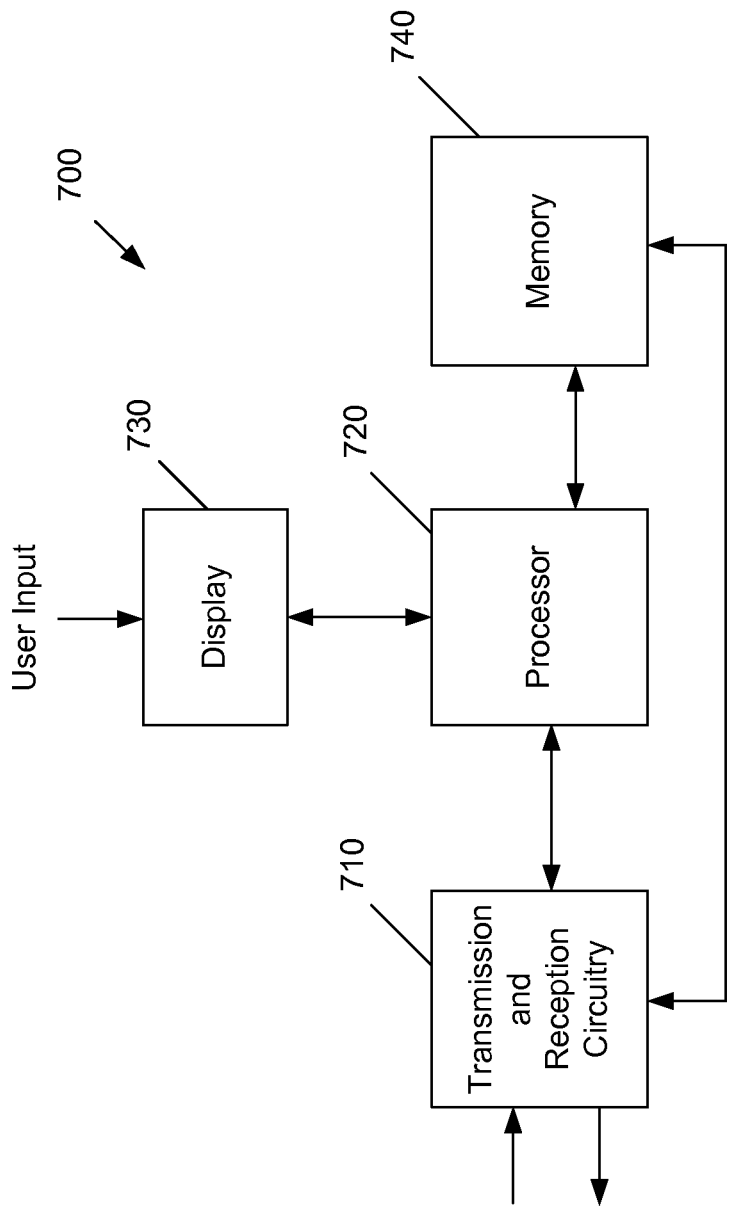
FIG. 7 shows in block diagram form a smart phone implementation of a client device in accordance with an aspect.

FIG. 7 shows a block diagram of an example smart phone implementation of a client device in accordance with an aspect. The smart phone 700 includes transmission and reception circuitry 710 for receiving and outputting data, for example, over a Wi-Fi™ network. The smart phone 700 also includes a processor 720 that executes one or more programs stored in a memory 740 of the smart phone 700. In various aspects, the processor 720 executes one or more programs that causes an output of a probe request for information about another client device with which it desires to communicate. The probe request is subsequently output by the transmission and reception circuitry 710, and received by a group owner device of a group to which the smart phone 700 is assigned. The smart phone 700 also includes a display 730 that provides a user with the ability to enter commands, and those commands may include a command that initiates a probe request by the processor 720. The smart phone 700 further includes the memory 740 which stores information about client devices, as provided to the smart phone 700 by the group owner device of its group.

Various aspects also accommodate applications of Push Model services including advertising, coupon distribution, invitations to gaming, and/or the like. In conventional Wi-Fi Direct or peer-to-peer networks, continuous "advertisement type" data transmission by peer-to-peer devices can lead to too much data contention and collision. Some aspects disclosed herein can readily accommodate push model services as described in detail below. In various aspects, group owners devices include their own device attributes in frames transmitted with a destination address set to a broadcast address, such as with packet transmissions or beacon transmissions. The device attributes include information that the client devices within their respective groups intend to deliver through a push service. Also, the device attributes may span multiple information elements if larger byte sizes are needed to accommodate large-sized advertisements.

In some implementations, the "advertising" packets or beacons are sent infrequently by the group owners devices in order to reduce network load. For example, in some aspects, the "advertising" packets or beacons are sent right after (or concatenated with) every $10^{th}$ information element packet or beacon that is output by a group owner device for providing device information to client devices within its group. In some other implementations, group owner devices in a geographical region may be assigned a predetermined interval for sending such advertising packets, such as between a time $t_1$ and a time $t_2$ every hour (e.g., between the $5^{th}$ and $6^{th}$ minutes of every hour). That way, the pushing of advertisements is limited to only a particular time frame or time period during the day.

In some implementations, a group owner device may relay information elements of device attributes of client devices within groups of other group owner devices (e.g., neighboring or adjacently-located group owner devices) as provided in packets or beacons received from the other group owner devices. This may enable multi-hop discovery and range extension, such as a device in a first group finding out about elements in a fourth group that is three hops down from the first group. For example, with reference to FIG. 3, in various aspects the group owner device 310 of the first group sends a packet or beacon that is received by the group owner device 320 of the second group, which includes that information in a packet or beacon sent by the group owner device 320 that is received by the group owner device 330 of the third group, which includes that information in a packet or beacon sent by the group owner device 330 that is received by the group owner device 340 of the fourth group. In such an example, the group owner device 340 of the fourth group eventually receives the information of elements for the client devices within the first group by way of the group owner device 320 and the group owner device 330 forwarding that information to the group owner device 340.

In some aspects, a load of packets or beacons may be adjusted to reduce congestion on a peer-to-peer network by performing the following steps. In a first step, pushed data is classified into one of several predefined categories (e.g., "gaming data"; "advertisement data"; "coupon distribution data"). In a second step, a group owner device receives advertisement data pushed to it from client devices (e.g., stations) within its group, and advertisement data pushed to it from client devices in other neighboring groups (via beacons output by group owner devices of those neighboring groups). In a third step, data of a subset of the predefined categories is included in any given beacon output by a group owner device.

For example, in one implementation, a group owner device outputs an "advertisement" packet or beacon at a first predetermined time (e.g., during the $5^{th}$ minute of every hour) that contains solely advertisement data, and the group owner device outputs a "gaming data" packet or beacon at a second predetermined time (e.g., during the $6^{th}$ minute of every hour) that contains solely "gaming data," and the group owner device outputs a "coupon distribution" packet or beacon at a third predetermined time (e.g., during the $7^{th}$ minute of every hour) that contains solely coupon distribution data.

In some implementations, a time that a beacon will be output by the group owner device that includes a pushed advertisement of another category is included in the beacon currently being output by the group owner device. This allows a client device to "sleep" (e.g., operate in a low power mode) until the packet or beacon of the category of information that it is looking for arrives on or in a packet or beacon. In the above example, if a neighboring group owner device is only looking for coupons for the client devices within its group, it would only turn on its receiver only during the $7^{th}$ minute of every hour to receive that information only and disregard the other information output by neighboring group owner devices.

An example of reducing a load of advertisement packets or beacons consistent with various aspects is provided herein. Referring to FIG. 3, for an example assume that the client device 360 in the second group is a smart phone and that a user of the smart phone in the second group wants a pizza, and assume that the client device 350 in the first group corresponds to a web site of a pizza delivery company. In such an example, the group owner device 310 of the first group outputs an advertisement packet or beacon that provides advertisement information of all client devices within the first group, and the group owner device 320 of the second group receives that advertisement packet or beacon. In the meantime, the group owner device 320 would have been informed by the client device 360 that it was looking for pizza, and so the advertisement information of the client device 350 would be pushed all the way to the client device 360 by the group owner device 320. After being informed of the existence of the pizza delivery company web site at the client device 350 as well as network connectivity information, the client device 360 can then communicate with the client device 350 (via the group owner device 320 and the group owner device 310, or via other means) to consummate a pizza order transaction.

In another example consistent with various aspects, assume the client device 350 in the first group is a computer operated by a "gamer" who desires to play an online game with another person, and that request is sent by the client device 350 to the group owner device 310 of the first group, and then "advertised" in an advertisement packet or beacon output by the group owner device 310 to neighboring group owner devices. In the example, the group owner device 320 receives the advertisement packet or beacon, and also receives a request from the client device 360, which in the example is a computer operated by another user who also desires to play the same game, where the request may be received by way of a request output by the client device 360 to the group owner device 320. As such, the advertisement information provided in an advertisement beacon output by the group owner device 310 is "pushed" by the group owner device 320 to the client device 360, along with network connectivity information, to allow the client device 360 and the client device 350 to communicate with each other and thus allow for playing the desired game.

Figure 8:
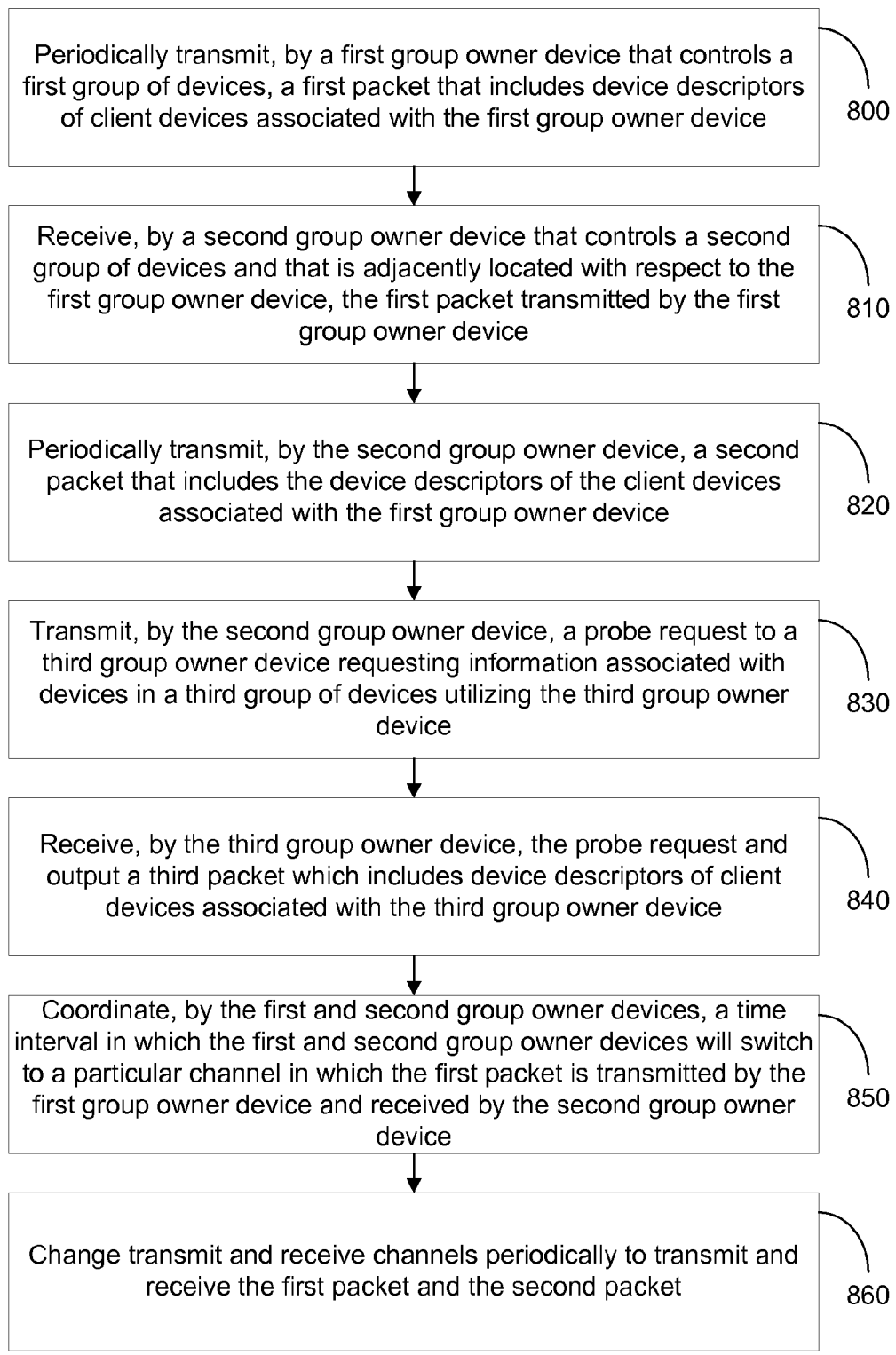
FIG. 8 illustrates a flowchart of a method in accordance with an aspect.

FIG. 8 illustrates a flowchart of an information providing method in accordance with an aspect for a wireless network having a plurality of group owner devices respectively controlling a plurality of groups of devices. Step 800 includes periodically transmitting, by a first group owner device that controls a first group of devices, a first packet that includes device descriptors of client devices associated with the first group owner device. Step 810 includes receiving, by a second group owner device that controls a second group of devices and that is adjacently located with respect to the first group owner device, the first packet transmitted by the first group owner device. Step 820 includes periodically transmitting, by the second group owner device, a second packet that includes the device descriptors of the client devices associated with the first group owner device. In various aspects, the second packet further includes device descriptors of client devices associated with the second group owner device.

Step 830 includes transmitting, by the second group owner device, a probe request to a third group owner device requesting information associated with devices in a third group of devices utilizing the third group owner device. Step 840 includes receiving, by the third group owner device, the probe request and outputting a third packet which includes device descriptors of client devices associated with the third group owner device. In various aspects the outputting of the third packet is performed by the third group owner device separate from and in addition to the third group owner device periodically transmitting the third packet to other neighboring group owner devices. In some aspects, the third packet includes information about devices of a fourth group of devices that is adjacently located with respect to the third group of devices and that is provided to the third group owner device by a fourth group owner device.

Step 850 includes coordinating, by the first and second group owner devices, a time interval in which the first and second group owner devices will switch to a particular channel in which the first packet is transmitted by the first group owner device and received by the second group owner device. Step 860 includes changing transmit and receive channels periodically to transmit and receive the first packet and the second packet.

In various aspects, the first packet includes channel information that designates a channel on which future packets will be output by the first group owner device. In some aspects, the first packet includes geo-location information of at least one device provided within the first group of devices. Also, in some aspects, the geo-location information is utilized by a station within the first group of devices to communicate with a station within the second group of devices. In various aspects, the first packet includes operating channel information of at least one device provided in the first group of devices.

Figure 9:
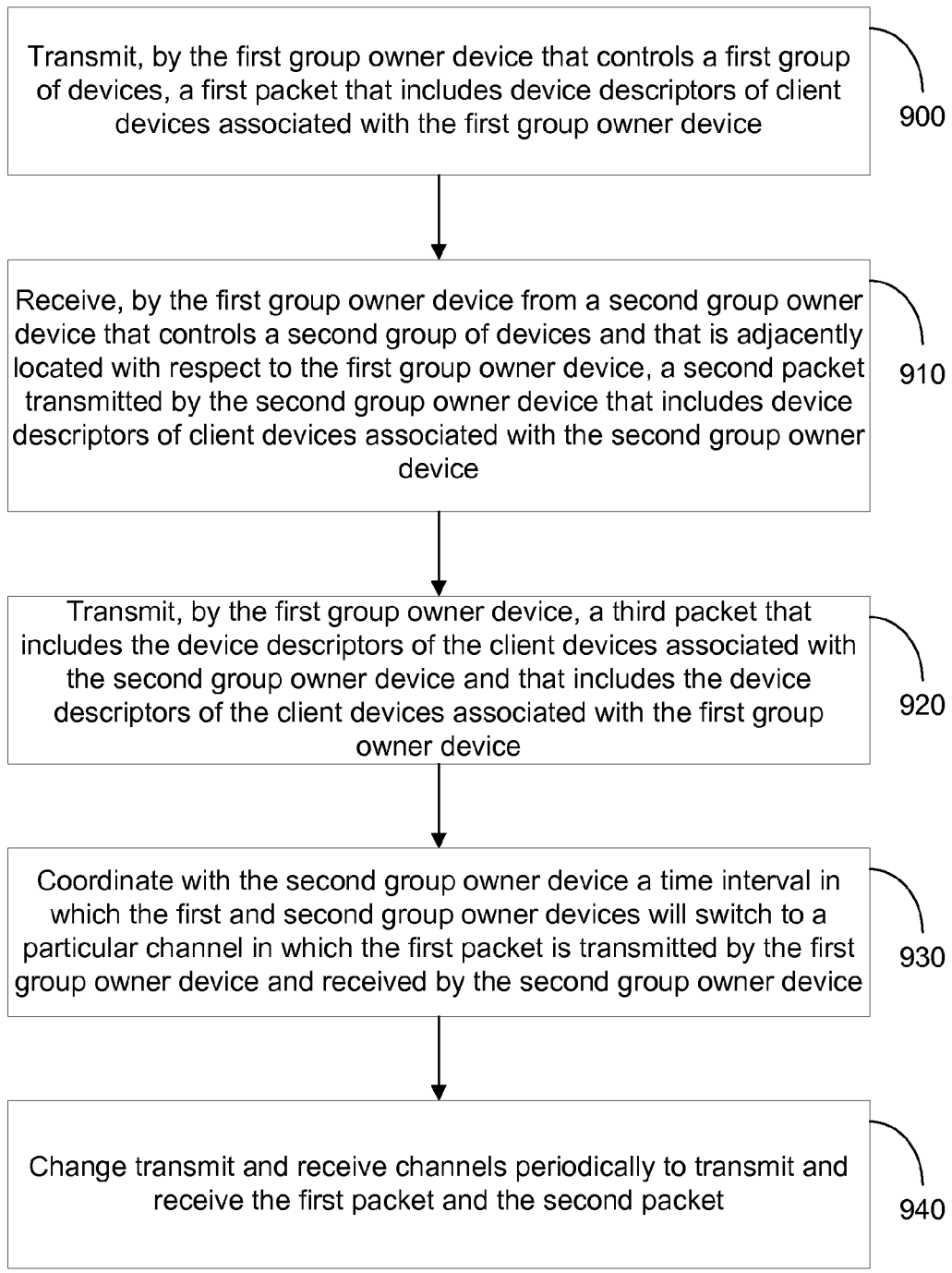
FIG. 9 illustrates a flowchart of a method in accordance with an aspect.

A non-transitory processor readable storage medium in accordance with various aspects stores one or more programs that, when executed by one or more processors of a first group owner device, cause the first group owner device to perform a method as illustrated by a flowchart in FIG. 9. Step 900 includes transmitting, by the first group owner device that controls a first group of devices, a first packet that includes device descriptors of client devices associated with the first group owner device. Step 910 includes receiving, by the first group owner device from a second group owner device that controls a second group of devices and that is adjacently located with respect to the first group owner device, a second packet transmitted by the second group owner device that includes device descriptors of client devices associated with the second group owner device. Step 920 includes transmitting, by the first group owner device, a third packet that includes the device descriptors of the client devices associated with the second group owner device and that includes the device descriptors of the client devices associated with the first group owner device. In various aspects, the first and second packets correspond to first and second beacons, respectively.

Step 930 includes coordinating with the second group owner device a time interval in which the first and second group owner devices will switch to a particular channel in which the first packet is transmitted by the first group owner device and received by the second group owner device. Step 940 includes changing transmit and receive channels periodically to transmit and receive the first packet and the second packet.

In various aspects, the first packet includes channel information that designates a channel on which future packets will be output by the first group owner device. In some aspects, the first packet includes geo-location information of at least one device provided within the first group of devices. Also, in some aspects, the geo-location information is utilizable by a station within the first group of devices to communicate with a station within the second group of devices. In various aspects, the second packet further includes device descriptors of client devices associated with a third group owner device, and the third packet further includes the device descriptors of the client devices associated with the third group owner device.

Figure 10:
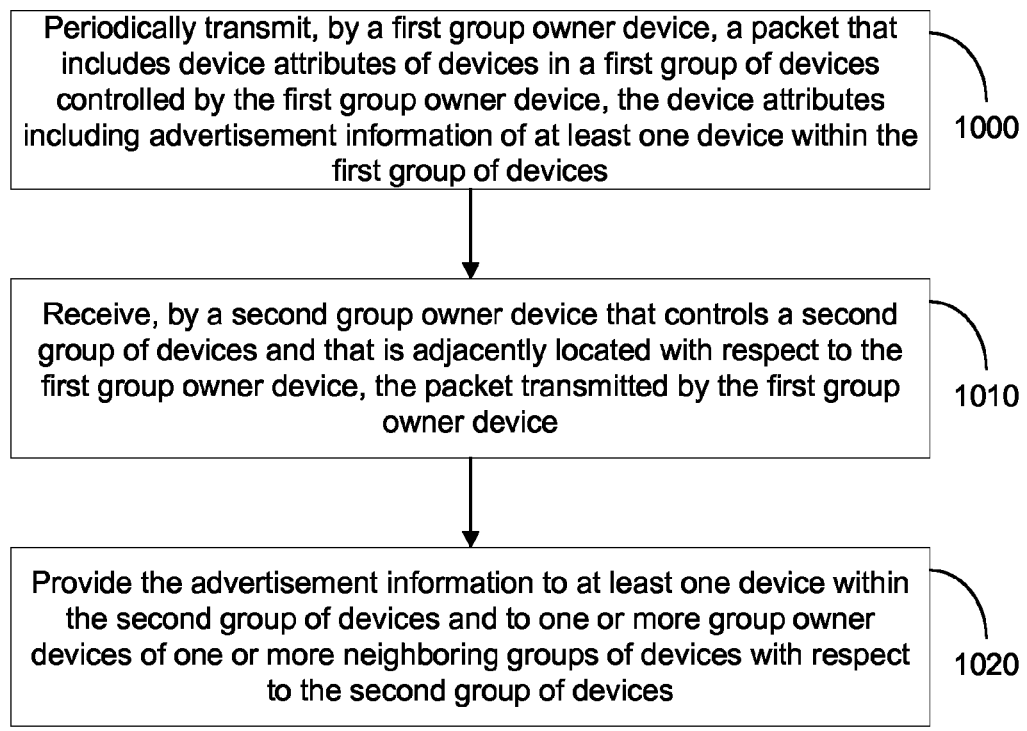
FIG. 10 illustrates a flowchart of a method in accordance with an aspect.

FIG. 10 illustrates a flowchart of an information providing method in accordance with an aspect for a wireless network having a plurality of group owner devices respectively controlling a plurality of groups of devices. Step 1000 includes periodically transmitting, by a first group owner device, a packet that includes device attributes of devices in a first group of devices controlled by the first group owner device, where the device attributes include advertisement information of at least one device within the first group of devices. Step 1010 includes receiving, by a second group owner device that controls a second group of devices and that is adjacently located with respect to the first group owner device, the packet transmitted by the first group owner device. Step 1020 includes providing the advertisement information to at least one device within the second group of devices and to one or more group owner devices of one or more neighboring groups of devices with respect to the second group of devices.

In various aspects, the packet that includes the advertisement information is sent out with advertisements of a first type at a first predetermined time, and a second packet with advertisements of a second type is sent out at a second predetermined time that is different from the first predetermined time. Also, in various aspects, the packet that includes the advertisements of the first type also includes information as to when the second packet that includes the advertisements of the second type will be output.

In some aspects, the packet that includes the advertisement information of the at least one device within the first group of devices is transmitted by the first group owner device only in every $M^{th}$ packet output by the first group owner device, where M is a positive integer greater than one. Also, in some aspects, information in each packet output by the first group owner device is divided into N different categories, where N is a positive integer greater than one.

Figure 11:
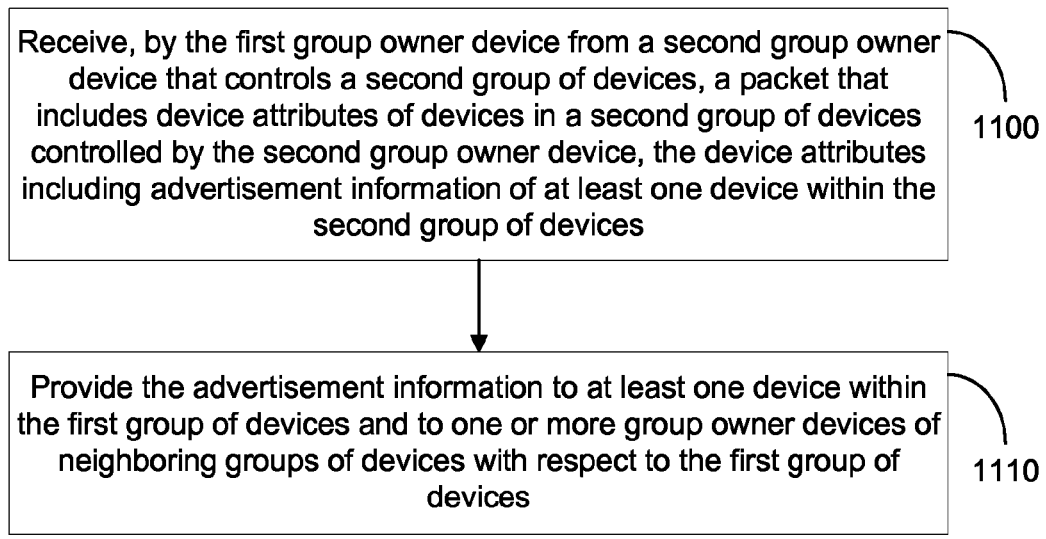
FIG. 11 illustrates a flowchart of a method in accordance with an aspect.

A non-transitory processor readable storage medium in accordance with an aspect stores one or more programs that, when executed by one or more processors of a first group owner device that controls a first group of devices, causes the first group owner device to perform a method as illustrated by the flowchart of FIG. 11. Step 1100 includes receiving, by the first group owner device from a second group owner device that controls a second group of devices, a packet that includes device attributes of devices in a second group of devices controlled by the second group owner device, where the device attributes include advertisement information of at least one device within the second group of devices. Step 1110 includes providing the advertisement information to at least one device within the first group of devices and to one or more group owner devices of neighboring groups of devices with respect to the first group of devices.

In various aspects, the packet that includes the advertisement information is sent out with advertisements of a first type at first predetermined times during the day, and a second packet with advertisements of a second type is sent out at second predetermined times during the day that are different from the first predetermined times. Also, in various aspects, the packet that includes the advertisements of the first type also includes information as to when the second packet that includes the advertisements of the second type will be output.

In some aspects, the packet that includes the advertisement information of the at least one device within the first group of devices is transmitted by the first group owner device only in every $M^{th}$ packet output by the first group owner device, where M is a positive integer greater than one. Also, in some aspects, the information in each packet output by the first group owner device is divided into N different categories, where N is a positive integer greater than one.

An apparatus in accordance with various aspects includes a processor and a receiving unit. In various aspects, the processor is configured to cause transmission a first packet that includes device descriptors of client devices in a first group of devices. In various aspects, the receiving unit is configured to receive a second packet transmitted by another apparatus in a second group of devices, where the second packet includes device descriptors of client devices in the second group of devices. Also, in various aspects, the processor is further configured to cause transmission of a third packet that includes the device descriptors of the client devices in the first group of devices and that includes the device descriptors of the client devices in the second group of devices.

In some aspects, the processor is further configured to periodically change transmit and receive channels used by the apparatus. Also, in some aspects, the processor is further configured to coordinate a time interval in which the apparatus switches to a particular channel in which the first packet is transmitted to the another apparatus. In various aspects, the first packet includes channel information that designates a channel on which the third packet will be output by the apparatus. Also, in various aspects, the first packet includes geo-location information of at least one device provided within the first group of devices. In some aspects, the first packet includes advertisement information for one or more client devices in the first group of devices. Also, in some aspects, the first packet includes operating channel information of at least one device provided in the first group of devices.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, units, processors, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a group owner device or client device.

In one or more exemplary aspects, the functions described may be implemented in hardware, software, firmware, or any combination thereof. If implemented in software, the functions may be stored as one or more instructions or programs on a computer-readable storage medium or processor-readable storage medium. A storage medium may be any available media that can be accessed by a computer or processor. By way of example, and not limitation, such computer-readable media and processor-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer and/or processor. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above are also included within the scope of computer-readable media and processor-readable media.

The previous description of the disclosed aspects is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method providing information for . . . , by a second packet that includes the device descriptors of the client devices associated with the first group owner device;
   transmitting, by the first group owner device, a third packet that includes the device descriptors of the client devices associated with the second group owner device and the device descriptors of the client devices associated with the first group owner device;
   receiving, by a second group owner device that controls a second group of devices and that is adjacently located with respect to the first group owner device, the first packet transmitted by the first group owner device; and
   periodically transmitting, by the second group owner device, a second packet that includes the device descriptors of the client devices associated with the first group owner device.

2. The method providing information according to claim 1, wherein the second packet further includes device descriptors of client devices associated with the second group owner device.

3. The method providing information according to claim 1, further comprising:
   transmitting, by the second group owner device, a probe request to a third group owner device requesting information associated with devices in a third group of devices utilizing the third group owner device; and
   receiving, by the third group owner device, the probe request and outputting a third packet which includes device descriptors of client devices associated with the third group owner device,
   wherein the outputting of the third packet is performed by the third group owner device separate from and in addition to the third group owner device periodically transmitting the third packet to other neighboring group owner devices.

4. The method providing information according to claim 1, wherein the third packet includes information about devices of a fourth group of devices that is adjacently located with respect to the third group of devices and that is provided to the third group owner device by a fourth group owner device.

5. The method providing information according to claim 1, further comprising:
   changing transmit and receive channels periodically to transmit and receive the first packet and the second packet.

6. The method providing information according to claim 5, further comprising:
   coordinating, by the first and second group owner devices, a time interval in which the first and second group owner devices will switch to a particular channel in which the first packet is transmitted by the first group owner device and received by the second group owner device.

7. The method providing information according to claim 1, wherein the first packet includes channel information that designates a channel on which future packets will be output by the first group owner device.

8. The method providing information according to claim 1, wherein the first packet includes geo-location information of at least one device provided within the first group of devices.

9. The method providing information according to claim 8, wherein the geo-location information is utilized by a station within the first group of devices to communicate with a station within the second group of devices.

10. The method providing information according to claim 1, wherein the first packet includes operating channel information of at least one device provided in the first group of devices.

11. A non-transitory processor readable storage medium storing one or more programs that, when executed by one or more processors of a first group owner device, cause the first group owner device to perform a method, the method comprising:
    transmitting, by the first group owner device that controls a first group of devices, a first packet that includes device descriptors of client devices associated with the first group owner device;
    receiving, by the first group owner device from a second group owner device that controls a second group of devices and that is adjacently located with respect to the first group owner device, a second packet transmitted by the second group owner device that includes device descriptors of client devices associated with the second group owner device; and
    transmitting, by the first group owner device, a third packet that includes the device descriptors of the client devices associated with the second group owner device and that includes the device descriptors of the client devices associated with the first group owner device.

12. The non-transitory processor readable storage medium according to claim 11, wherein the first and second packets correspond to first and second beacons, respectively.

13. The non-transitory processor readable storage medium according to claim 11, the method further comprising:
    changing transmit and receive channels periodically to transmit and receive the first packet and the second packet.

14. The non-transitory processor readable storage medium according to claim 13, the method further comprising:
    coordinating with the second group owner device a time interval in which the first and second group owner devices will switch to a particular channel in which the first packet is transmitted by the first group owner device and received by the second group owner device.

15. The non-transitory processor readable storage medium according to claim 11, wherein the first packet includes channel information that designates a channel on which future packets will be output by the first group owner device.

16. The non-transitory processor readable storage medium according to claim 11, wherein the first packet includes geo-location information of at least one device provided within the first group of devices.

17. The non-transitory processor readable storage medium according to claim 16, wherein the geo-location information is utilizable by a station within the first group of devices to communicate with a station within the second group of devices.

18. The non-transitory processor readable storage medium according to claim 11,
wherein the second packet further includes device descriptors of client devices associated with a third group owner device; and
wherein the third packet further includes the device descriptors of the client devices associated with the third group owner device.

19. An information providing method for a wireless network having a plurality of group owner devices respectively controlling a plurality of groups of devices, comprising:
periodically transmitting, by a first group owner device, a packet that includes device attributes of devices in a first group of devices controlled by the first group owner device, the device attributes including advertisement information of at least one device within the first group of devices;
receiving, by a second group owner device that controls a second group of devices and that is adjacently located with respect to the first group owner device, the packet transmitted by the first group owner device; and
providing the advertisement information to at least one device within the second group of devices and to one or more group owner devices of one or more neighboring groups of devices with respect to the second group of devices.

20. The information providing method according to claim 19, wherein the packet that includes the advertisement information is sent out with advertisements of a first type at a first predetermined time, and a second packet with advertisements of a second type is sent out at a second predetermined time that is different from the first predetermined time.

21. The information providing method according to claim 20, wherein the packet that includes the advertisements of the first type also includes information as to when the second packet that includes the advertisements of the second type will be output.

22. The information providing method according to claim 19, wherein the packet that includes the advertisement information of the at least one device within the first group of devices is transmitted by the first group owner device only in every $M^{th}$ packet output by the first group owner device, where M is a positive integer greater than one.

23. The information providing method according to claim 22, wherein information in each packet output by the first group owner device is divided into N different categories, where N is a positive integer greater than one.

24. A non-transitory processor readable storage medium storing one or more programs that, when executed by one or more processors of a first group owner device that controls a first group of devices, causes the first group owner device to perform a method, the method comprising:
receiving, by the first group owner device from a second group owner device that controls a second group of devices, a packet that includes device attributes of devices in a second group of devices controlled by the second group owner device, the device attributes including advertisement information of at least one device within the second group of devices;
providing the advertisement information to at least one device within the first group of devices and to one or more group owner devices of neighboring groups of devices with respect to the first group of devices.

25. The non-transitory processor readable storage medium according to claim 24, wherein the packet that includes the advertisement information is sent out with advertisements of a first type at first predetermined times during the day, and a second packet with advertisements of a second type is sent out at second predetermined times during the day that are different from the first predetermined times.

26. The non-transitory processor readable storage medium according to claim 25, wherein the packet that includes the advertisements of the first type also includes information as to when the second packet that includes the advertisements of the second type will be output.

27. The non-transitory processor readable storage medium according to claim 24, wherein the packet that includes the advertisement information of the at least one device within the first group of devices is transmitted by the first group owner device only in every $M^{th}$ packet output by the first group owner device, where M is a positive integer greater than one.

28. The non-transitory processor readable storage medium according to claim 27, wherein the information in each packet output by the first group owner device is divided into N different categories, where N is a positive integer greater than one.

29. An apparatus, comprising:
a processor configured to cause transmission a first packet that includes device descriptors of client devices in a first group of devices;
a receiving unit configured to receive a second packet transmitted by another apparatus in a second group of devices, the second packet including device descriptors of client devices in the second group of devices;
the processor further configured to cause transmission of a third packet that includes the device descriptors of the client devices in the first group of devices and includes the device descriptors of the client devices in the second group of devices.

30. The apparatus according to claim 29,
the processor further configured to periodically change transmit and receive channels used by the apparatus.

31. The apparatus according to claim 30, wherein the processor is further configured to coordinate a time interval in which the apparatus switches to a particular channel in which the first packet is transmitted to the another apparatus.

32. The apparatus according to claim 29, wherein the first packet includes channel information that designates a channel on which the third packet will be output by the apparatus.

33. The apparatus according to claim 29, wherein the first packet includes geo-location information of at least one device provided within the first group of devices.

34. The apparatus according to claim 29, wherein the first packet includes advertisement information for one or more client devices in the first group of devices.

35. The apparatus according to claim 29, wherein the first packet includes operating channel information of at least one device provided in the first group of devices.

36. An apparatus, comprising:
means for transmitting a first packet that includes device descriptors of client devices associated with the apparatus;
means for receiving, from a second apparatus that controls a group of devices associated with the second apparatus, a second packet transmitted by the second apparatus that includes device descriptors of client devices associated with the second apparatus; and
means for transmitting a third packet that includes the device descriptors of the client devices associated with the apparatus and that includes the device descriptors of the client devices associated with the second apparatus.

37. The apparatus according to claim 36, further comprising:

means for periodically changing transmit and receive channels used by the apparatus.

38. The apparatus according to claim 37, wherein the means for periodically changing is configured to coordinate a time interval in which the apparatus switches to a particular channel in which the first packet is transmitted to the second apparatus.

39. The apparatus according to claim 36, wherein the first packet includes channel information that designates a channel on which the third packet will be output by the apparatus.

40. The apparatus according to claim 36, wherein the first packet includes geo-location information of at least one device associated with the apparatus.

41. The apparatus according to claim 36, wherein the first packet includes advertisement information about at least one device associated with the apparatus.

* * * * *